(12) United States Patent
Eto

(10) Patent No.: US 6,256,449 B1
(45) Date of Patent: Jul. 3, 2001

(54) IMAGE ENCODER AND IMAGE DECODER

(75) Inventor: Toru Eto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/024,758

(22) Filed: Feb. 17, 1998

Related U.S. Application Data

(63) Continuation of application No. PCT/JP97/02270, filed on Jul. 1, 1997.

(30) Foreign Application Priority Data

Jul. 1, 1996 (JP) .................................................. 8-189983

(51) Int. Cl.$^7$ ...................................................... H04N 9/79
(52) U.S. Cl. .............................................. 386/27; 386/44
(58) Field of Search ................................ 386/1, 34, 40, 386/45, 95, 98, 111, 112, 125, 33, 13, 16, 17, 27, 28, 44; 370/472, 389; 348/409; H04N 9/79

(56) References Cited

U.S. PATENT DOCUMENTS

| | | | |
|---|---|---|---|
| 5,696,557 | * 12/1997 | Yamashita et al. | 386/111 |
| 5,729,651 | * 3/1998 | Matsumoto | 386/95 |
| 5,771,330 | * 3/1998 | Takano et al. | 386/52 |
| 5,841,935 | * 11/1998 | Asai et al. | 386/33 |
| 5,903,569 | * 5/1999 | Fujisaki | 370/472 |
| 5,946,307 | * 8/1999 | Ohkuwa | 370/389 |

FOREIGN PATENT DOCUMENTS

| | | |
|---|---|---|
| 630155 A2 | 12/1994 | (EP) . |
| 63-031389 | 2/1988 | (JP) . |
| 2-100588 | 4/1990 | (JP) . |
| 7-023327 | 1/1995 | (JP) . |

* cited by examiner

*Primary Examiner*—Huy Nguyen
(74) *Attorney, Agent, or Firm*—Frommer Lawrence & Haug, LLP.; William S. Frommer; Joe H. Shallenburger

(57) ABSTRACT

In an image encoder and an image decoder of an image transmission system, enabling the deterioration of decoded images in image quality to be avoided, the color frame information $D_{CF}$ in separating a predetermined video signal into a luminance component and a color component (chroma component) is extracted prior to the compressive encoding processing of a video signal $S_{SDI1}$, added after the compressive encoding processing and delivered to transmission means 18A, and moreover the color frame information is extracted prior to the decoding processing of the compressed video signal $S_{SDDI1}$ obtained from the transmission means 18A and is added after the decoding processing, thereby enabling data on color frame information $D_{CF}$ to be added to the decoded video signal $S_{SDI1}$ after the decoding processing as they remain invariant free from deformation (loss) and delivered to the transmission means. Thus, a playback video signal (composite video signal) $S_{OUTA}$ can be obtained using the color frame information in the decoded video signal $S_{SDI1}$ and therefore the deterioration of playback images can be prevented.

34 Claims, 8 Drawing Sheets

11A

16A

IMAGE ENCODER AND IMAGE DECODER

This is a continuation of copending International Application PCT/JP97/02270 having an international filing date of Jul. 1, 1997.

FIELD OF THE ART

The present invention relates to an image encoder and an image decoder and, for example, is suitably applied to an image encoder and an image decoder in an image transmission system which after a composite video signal is converted into component video signals, they are compressively coded and delivered to transmission means and moreover the coded video signal obtained from the transmission means is restored to a composite video signal after decoded.

BACKGROUND ART

Conventionally, there is a record/play system (image transmission system) called server which, for example, by selecting a predetermined input terminal from a plurality of input terminals, inputs and records a video signal from the desired video source and simultaneously reproduces it if necessary, selects the desired output terminal from a plurality of output terminals for the output of a reproduced image.

In this system, a composite video signal is converted into the predetermined signal format on the input side, recorded in compressed codes into a record/play apparatus and simultaneously data reproduced from the record/play apparatus are outputted after decoded and then restored in a composite video signal on the input side.

Meanwhile, in a record/play system of such an arrangement, the color frame information obtained in the Y/C separation of the composite signal inputted is lost (changes) in the process of compressive encoding processing and is not conserved in the processing of a record/play system. As a result, in returning the video signal reproduced from the record/play apparatus to a composite signal, there was a problem that no chroma modulation based on the color frame information is performed and consequently the resolution of a reproduced image and so on are deteriorated, thus the deterioration of images is inevitable.

DISCLOSURE OF INVENTION

Made in consideration of these problems, the present invention has an object of proposing an image encoder and an image decoder in an image transmission system enabling the deterioration of decoded images to be avoided.

To solve such problems, the present invention extracts the color frame information previously added to said input video signal prior to said compressive encoding and adds the color frame information extracted to the compressed video signal after said compressive encoding.

Besides, the present invention extracts the color frame information added to the compressed video signal prior to the decoding and adds the color frame information extracted to the decoded video signal after the decoding.

According to the present invention, color frame information is transmitted via the compressive encoding and decoding, so that chroma modulation can be made in accordance with the color frame information in converting the decoded video signal into a composite video signal, thereby enabling the deterioration of images to be avoided.

BEST MODE FOR CARRYING OUT THE INVENTION

Figure 1:
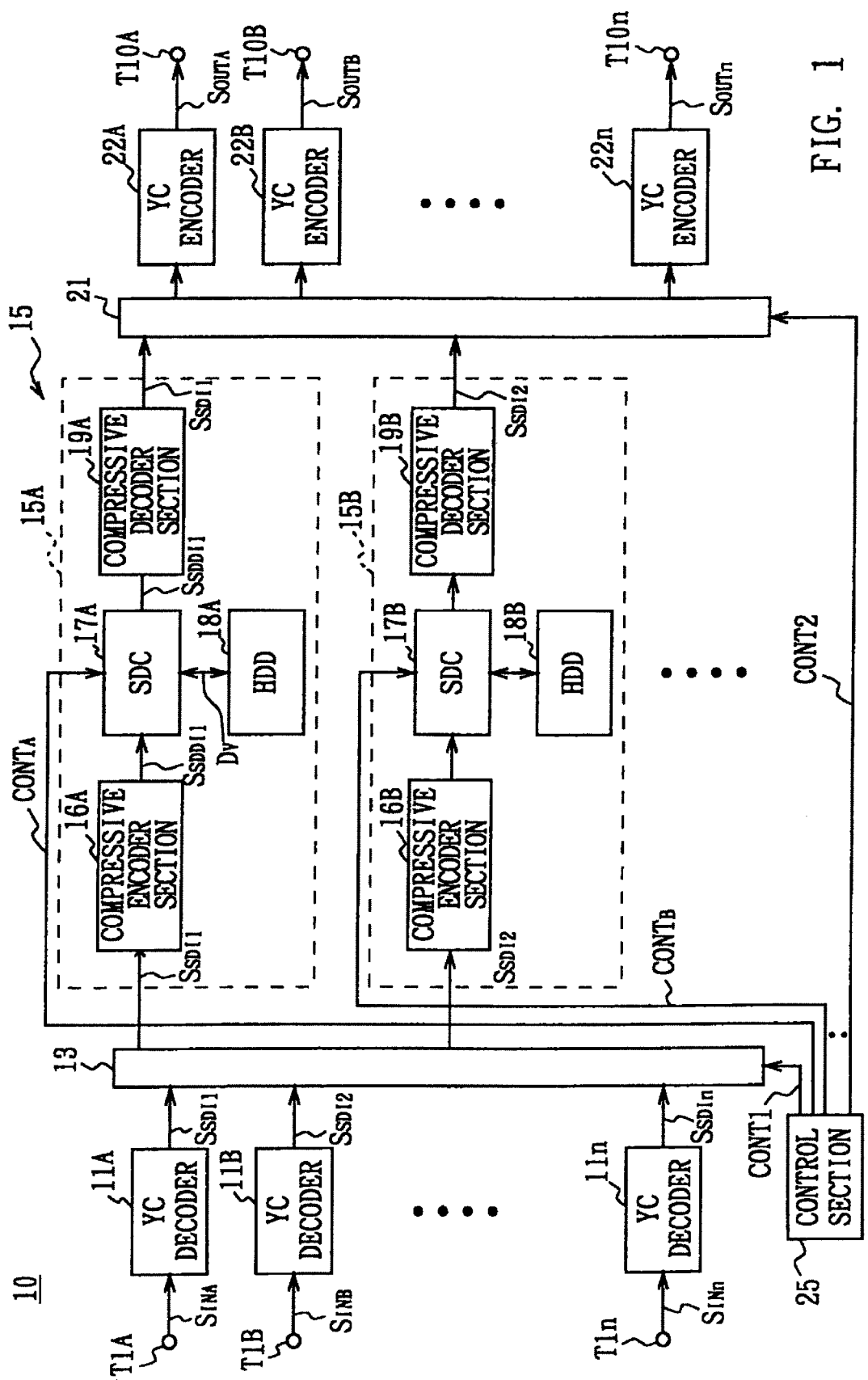
FIG. 1 is a block diagram showing one embodiment of record/play system using an image encoder and an image decoder according to the present invention.

Preferred embodiment of the present invention will be described with reference to the accompanying drawings:

FIG. 1 shows the general construction of a record/play system for recording/playing a video signal.

This record/play system is composed of a plurality of input terminals T1A, T1B, . . . , T1$n$ (n=A,B, . . . ), a selection circuit 13, a record unit 15A, 15B, . . . , a selection circuit 21, YC encoders 22A, 22B, . . . , 22$n$, and output terminals T10A, T10B, . . . , T10$n$.

The pulurality of input terminals T1A, T1B, . . . , T1$n$ are connected to equipment used in a broadcasting station such as multiple video tape recorders (VTRs), an editing system, a cassette auto changer or the like, but not shown in Fig. Video signals from such equipment are fed to the plurality of input terminals T1A, T1B, . . . , T1$n$. Composite video signals $S_{INA}$, $S_{INB}$, . . . , $S_{INn}$ thus inputted are supplied to YC decoders 11A, 11B, . . . , 11$n$ connected to the respective input terminals.

Figure 2:
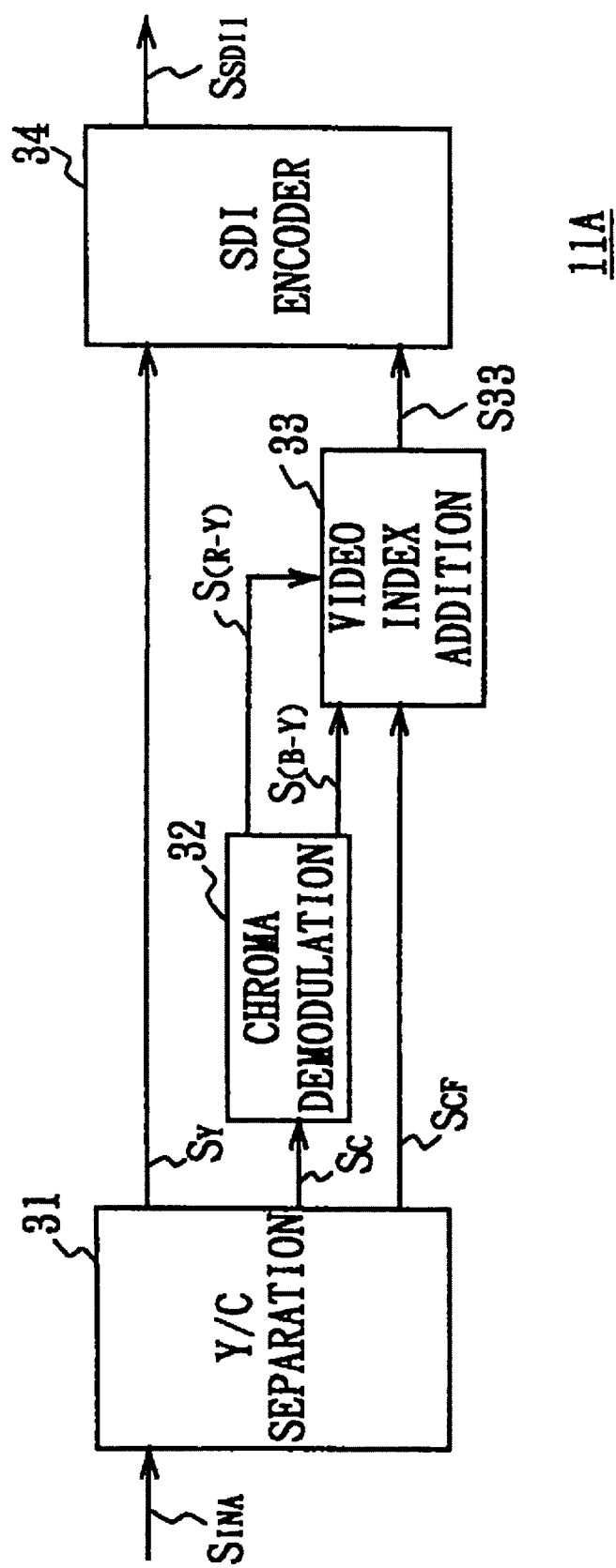
FIG. 2 is a block diagram showing the configuration of a YC decoder.

FIG. 2 shows the configuration of each YC decoder 11A, 11B, . . . , 11$n$.

Each YC decoder 11A, 11B, . . . , 11$n$ is composed of a Y/C separation circuit 31, a chroma demodulation circuit 32, a video index addition-circuit 33, and an SDI encoder 34. The Y/C separating circuit 31 separates the composite video signal $S_{INA}$ into a brightness signal $S_Y$ and a chroma signal $S_C$, and simultaneously extracts a color frame information signal $S_{CF}$ from that signal. The chroma demodulation circuit 32 outputs two color-difference signals $S_{(R-Y)}$ and $S_{(B-Y)}$ obtained by inputting and demodulating the chroma signal $S_C$ separated at the Y/C separation circuit 31. The video index addition circuit 33, fed two signals from the chroma demodulation circuit 32 and the color frame information signal $S_{CF}$ separated from the composite video signal $S_{INA}$ in the Y/C separation circuit 31 and the color frame information signal $S_{CF}$, outputs an index signal S33 which the color frame information signal $S_{CF}$ is added to a part of these two color-difference signals $S_{(R-Y)}$ and $S_{(B-Y)}$. The SDI encoder 34, fed the index signal S33 which the color frame information signal $S_{CF}$ separated from the signal in the Y/C separation circuit 31 was added to a part of these two color-difference signals, outputs SDI signals $S_{SDI1}$, $S_{SDI2}$, . . . , $S_{SDIn}$ (n=1,2, . . . ), in a serial digital interface (SDI) format. Here, the color frame information outputted from the Y/C separation circuit 31 as the color frame information signal $S_{CF}$ specifies the phase of a color subcarrier used in separating a composite video signal into a luminance component Y and a chroma component C.

The composite video signal $S_{INA}$ obtained from the first input terminal T1A is first fed to the Y/C separation circuit 31. The Y/C separation circuit 31 separates the composite video signal $S_{INA}$ into a brightness signal $S_Y$ and a chroma signal $S_C$, and at the same time of feeding the brightness signal $S_Y$ to the SDI encoder 34, delivers the chroma signal $S_C$ to a chroma demodulation circuit 32 at the following stage.

The chroma demodulation circuit 32, by demodulating the chroma signal $S_C$ outputted from the Y/C separation circuit 31, obtains two color-difference signals $S_{(R-Y)}$ and $S_{(B-Y)}$. Here, the color-difference signal $S_{(R-Y)}$ represents a difference between the red primary color component R and the luminance component Y and the coloring matter signals $S_{(B-Y)}$ represents a difference between the blue primary color component B and the luminance component Y. The color-difference signals $S_{(R-Y)}$ and $S_{(B-Y)}$ demodulated in the chroma demodulation circuit 32 are delivered to the video index addition circuit 33.

After adding a color frame information signal outputted from the Y/C separation circuit 31 to a part of color-difference signals $S_{(R-Y)}$ and $S_{(B-Y)}$ as video index (SMPTERP-186 standard), the video index addition circuit 33 delivers this to the SDI encoder as the index signal S33.

Here, the color frame information specifies the color subcarrier used in separating a composite video signal into the luminance component and the chroma component as described above, but with the 525 scanning line/60 field scheme, the phase of a subcarrier differs by 180-degree between a first color frame and a second color frame.

Figure 3:
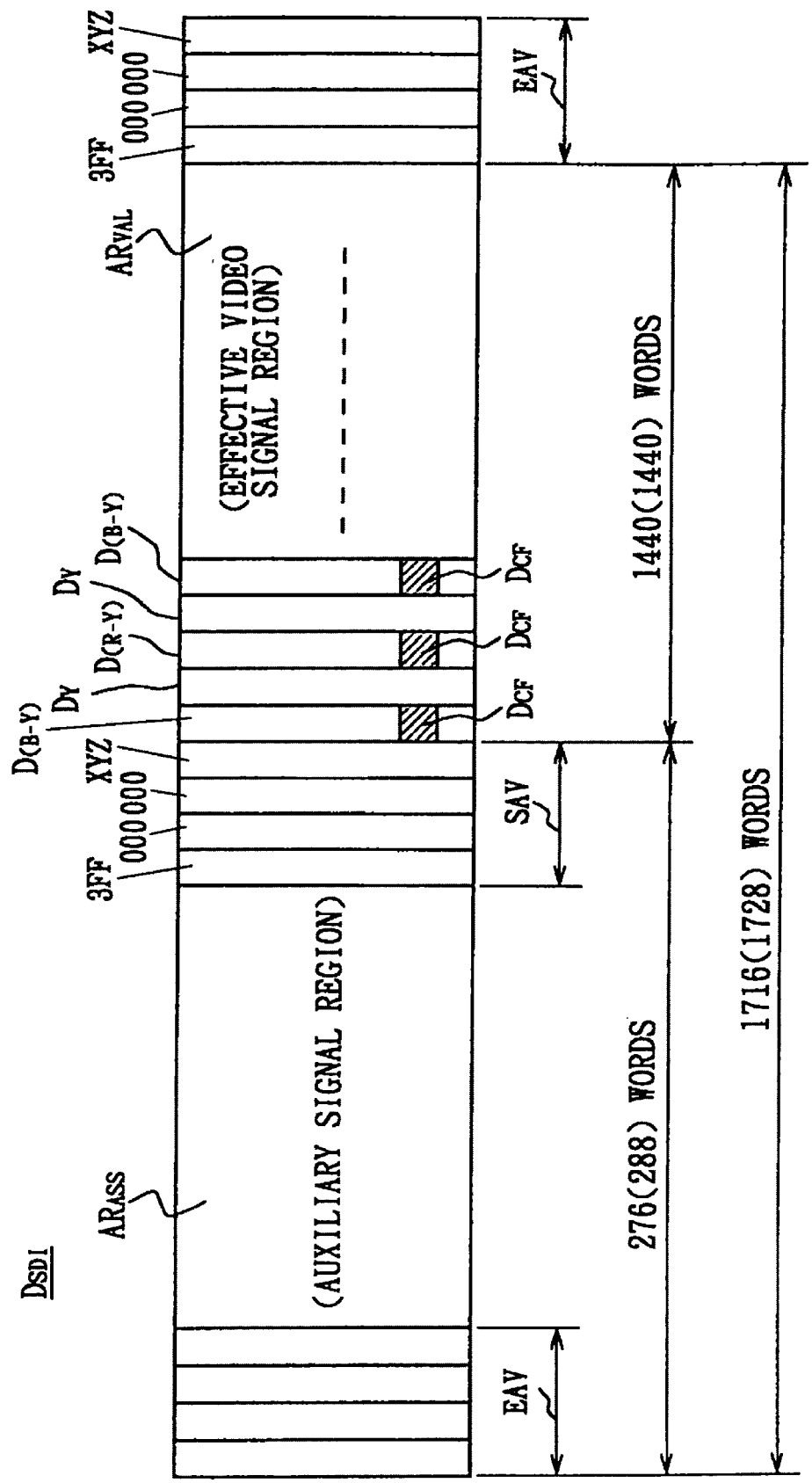
FIG. 3 is a schematic diagram illustrating an SDI format.

Thus, the video index addition circuit 33 adds the class of the relevant phase to a part of the color-difference signals $S_{(B-Y)}$ and $S_{(R-Y)}$, i.e., color frame information indicating either one of the first or the second color frame and delivers it to the SDI encoder 34. The SDI encoder 34 generates a component serial data $D_{SDI}$ in the SDI format with the color frame information data $D_{CF}$ added to a part of color-difference data $D_{(B-Y)}$ and $D_{(R-Y)}$. FIG. 3 shows the SDI signal format.

As shown in FIG. 3, in the component serial data $D_{SDI}$, an effective video signal region $AR_{VAL}$ is provided in succession to a timing reference signal EAV, an auxiliary signal region $AR_{ASS}$ and a standard signal SAV. Out of color-difference data $D_{(B-Y)}$ and $D_{(R-Y)}$ and brightness data $D_Y$ alternately formed in this effective video signal region $AR_{VAL}$, the color frame data $D_{CF}$ is added to a part of color-difference data $D_{(B-Y)}$ based on the blue component.

The SDI encoder 34, as shown in FIG. 1, delivers the component serial data $D_{SDI}$ of such composition to the following selection circuit 13 as an SDI signal $S_{SDI1}$. Besides, each YC decoder 11B, . . . , 11n of similar composition to the YC decoder 11A inputs the composite video signal $S_{INB}$, . . . , $S_{INn}$ delivered from the respective predetermined video sources and delivers the SDI signal $S_{SDI2}$, . . . , $S_{SDIn}$ obtained by effecting the similar processing to the above YC decoder 11A to the selection circuit 13, respectively.

In accordance with a control signal CONT1 delivered from the control section 25, the selection circuit 13 selects a predetermined SDI signal $S_{SDIx}$ out of a plurality of SDI signals $S_{SDI1}$, $S_{SDI2}$, . . . , $S_{SDIn}$ and simultaneously selects the destination of the relevant SDI signal $S_{SDIx}$ out of a plurality of record medium units 15A, 15B, . . . of the record medium unit section 15 provided as transmission means.

Each recording unit 15A, 15B, . . . of the recording unit section 15, as shown in FIG. 1, is composed of a compressive encoder section 16A, 16B, . . . , and an SDC circuit 17A, 17B, . . . , an HDD (Hard Disk Drive) 18A, 18B, . . . which are recording media, and a compressive decoder section 19A, 19B . . . .

Figure 4:
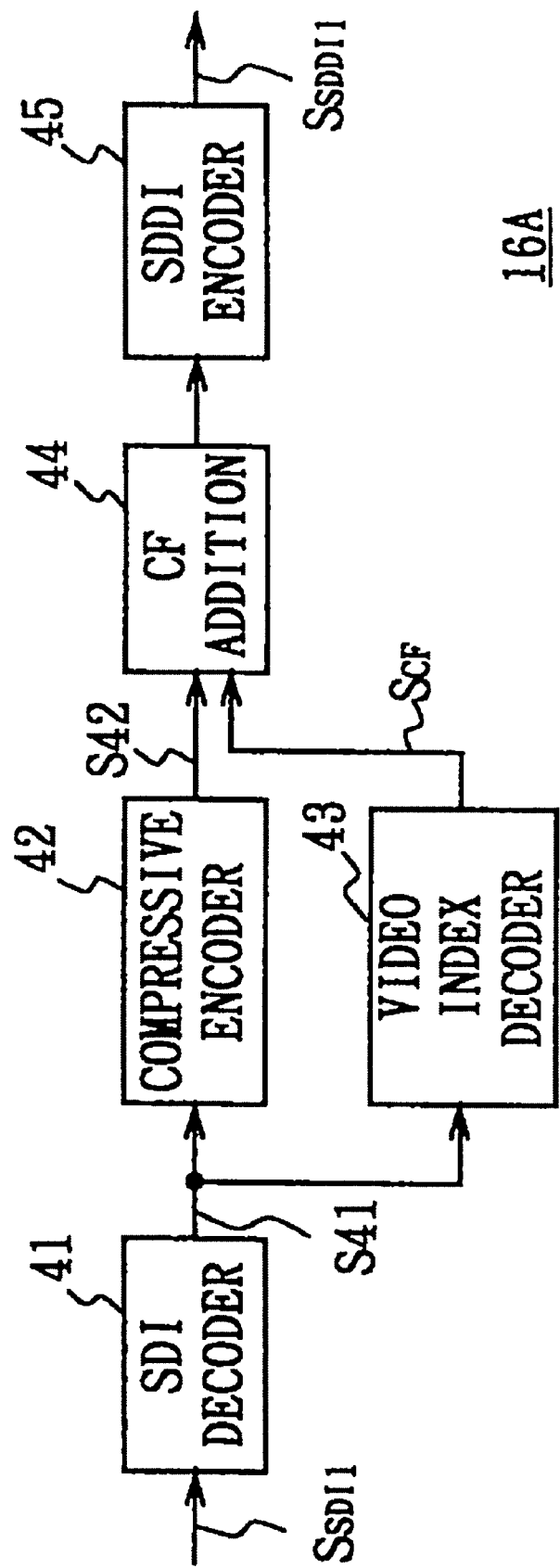
FIG. 4 is a block diagram showing one embodiment of a compressive encoder section using an image encoder according to the present invention.

Each compression encoder section 16A, 16B, . . . , as shown in FIG. 4, is composed of an SDI decoder circuit 41, fed the SDI signal delivered from the selection circuit, for outputting an SDI decoded signal; a compression encoder 42 for compressively encoding a video signal from the SDI decoded signal delivered from the SDI decoder circuit 41; a video index decoder 43, provided in parallel with the compression encoder circuit 42 and fed the SDI decoded signal S41 delivered from the SDI decoder circuit 41, for extracting a color frame information item from this SDI decoded signal S41, for outputting a color frame information signal; a color frame information addition circuit 44, fed the compressed video data from the compression encoder 42 and the color frame information signal from the video index decoder 43, for adding a color frame information item to the compressed video data and outputting this; and an SDDI encoder 45, fed the compressed video data with the color frame information added thereto from the color frame information addition circuit 44, for converting this data into a signal in the serial digital data interface (SDDI) format and outputting this.

In FIG. 1, when the selection circuit 13 assigns a first record medium unit 15A, for example, for a first SDI signal $S_{SDI1}$, the relevant SDI signal $S_{SDI1}$ is delivered to the compression encoder section 16A provided as image encoder of the record medium unit 15A. As shown in FIG. 4, by inputting and decoding the SDI signal $S_{SDI1}$ delivered from the selection circuit 13 to the SDI decoder 41, the compression encoder section 16A obtains an SDI decoded signal S41 to deliver it to the subsequent compressive encoder 42.

After the macro blocking of each color data $C_R$, $C_B$ and brightness data Y of the video data inputted by the SDI decoded signal S41, the compressive encoder 42 performs the discrete cosine transform (DCT) processing and a variable-length encoding processing of assigning the code length corresponding to the occurrence frequency of data, e.g., to accomplish a high-efficiency compressive encoding of the video data according to the approach of moving picture exports group (MPEG) video standard and obtaining a compressed video signal S42. This compressed video signal S42 is delivered to the subsequent color frame information addition circuit 44.

At the same time, the SDI decoded signal S41 delivered from the SDI decoder 41 is delivered to the video index decoder 43 parallel with the compression encoder 42. The video index decoder 43 extracts the color frame information $D_{CF}$ from the SDI decoded signal S41, and delivers it as the color frame information decoded signal $S_{CF}$ to the color frame information addition circuit 44.

After adding the color frame information $D_{CF}$ outputted as the color frame information signal $S_{CF}$ from the video index decoder 43 to a stream of the compressed video data outputted from the compressive encoder 42 as the compressed video signal S42, the color frame information addition circuit 44 delivers this to a serial digital data interface (SDDI) encoder 45.

Figure 5:
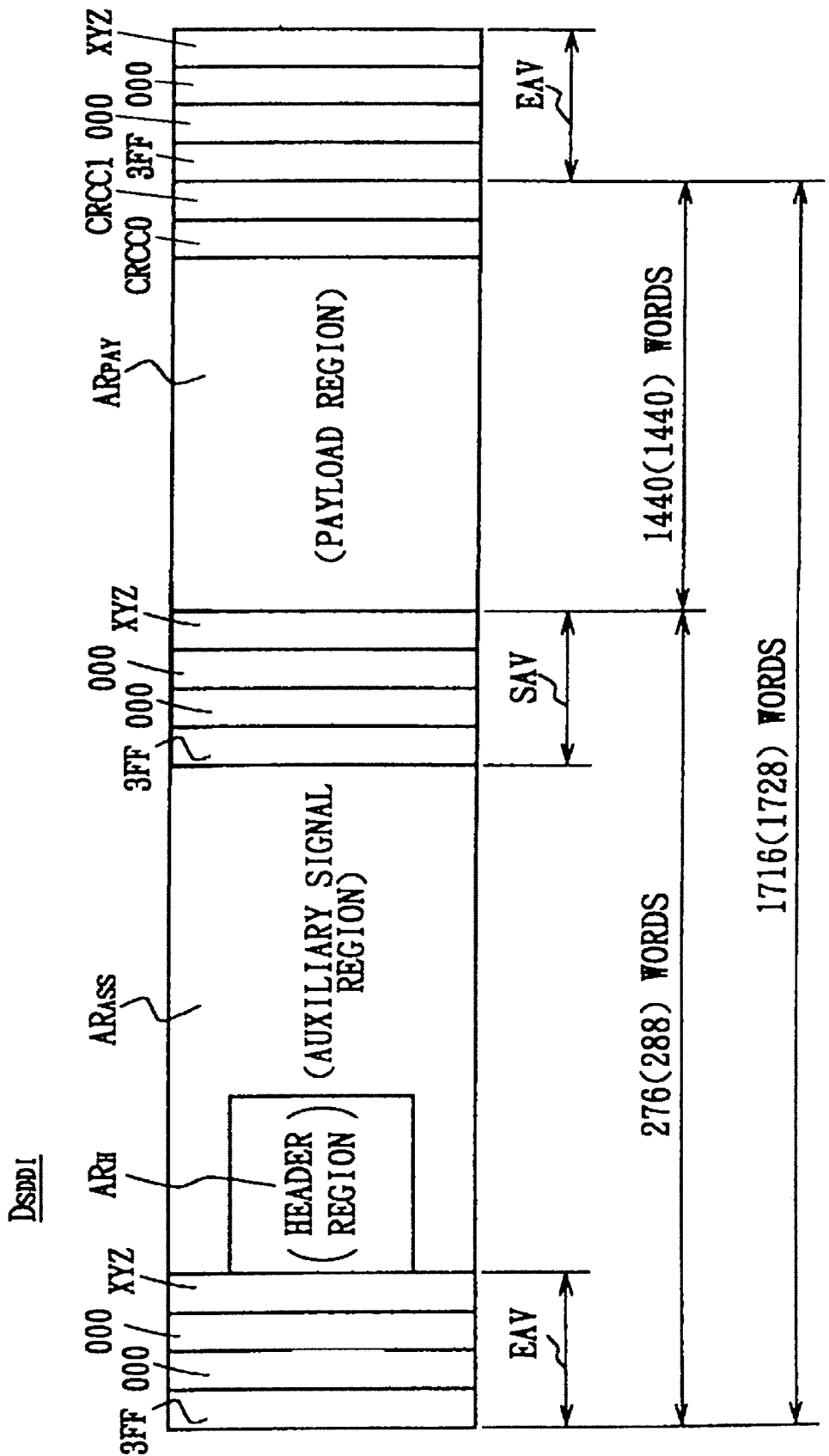
FIG. 5 is a schematic diagram illustrating an SDDI format.

By converting the compressed data with the color frame information added to the stream into an SDDI format, serial data $D_{SDDI}$ of such composition as shown in FIG. 5 are obtained. In the serial data $D_{SDDI}$, a payload region $AR_{PAY}$ is provided in succession to a timing reference signal EAV, a header region $AR_H$ including a source identification code, an auxiliary signal region $AR_{ASS}$ and a standard signal SAV. In this payload region $AR_{PAY}$, the compressed video data for each macro block (stream) are stored.

Figure 6:
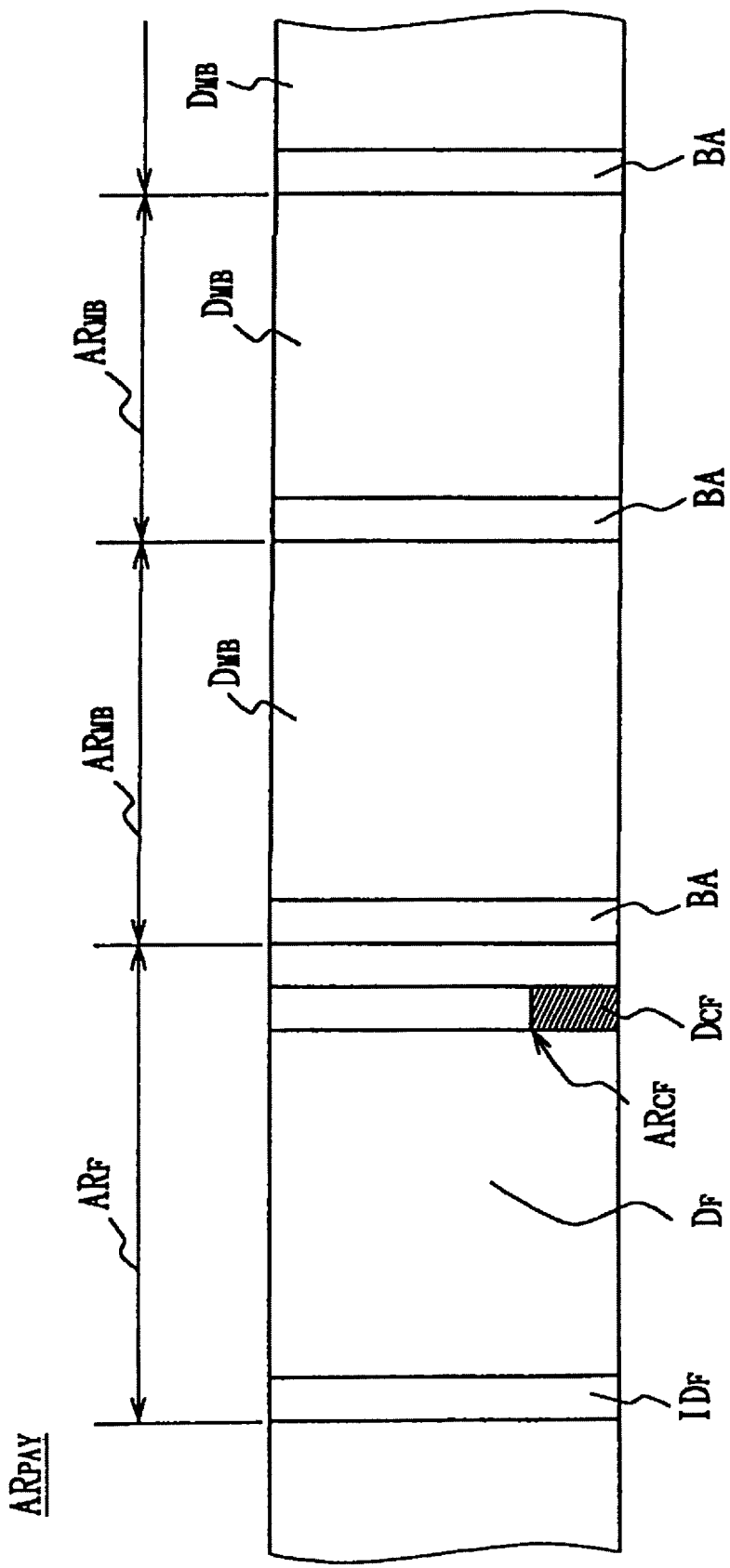
FIG. 6 is a schematic diagram showing items of color frame information added to a stream.

That is, in FIG. 6, the payload region $AR_{PAY}$ has a frame information region $AR_{FR}$ at the top of each frame followed by a macro block region $AR_{MB}$ to which each macro block data $D_{MB}$ is assigned. Macro block address data BA is provided at the top of each macro block region $AR_{MB}$ to indicate the position of the macro block in a frame.

Here, in the frame information region $AR_{FR}$, identification data $ID_F$ indicating the relevant frame information region is provided at the head portion and subsequently the compression processing information (DCT coefficient and suchlike) $D_F$ of each macro block in the relevant frame is provided. In a part of this compression processing information $D_F$, a color frame region $AR_{CF}$ provided with the color frame information $D_{CF}$ is formed.

Thus, the serial data $D_{SDDI}$ (FIG. 5) in the SDDI format including the color frame information $D_{CF}$ in a stream are delivered from the SDDI encoder 45 (FIG. 4) as an SDDI signal $S_{SDDI1}$ to a server data control (SDC) circuit 17A (FIG. 1).

Figure 7:
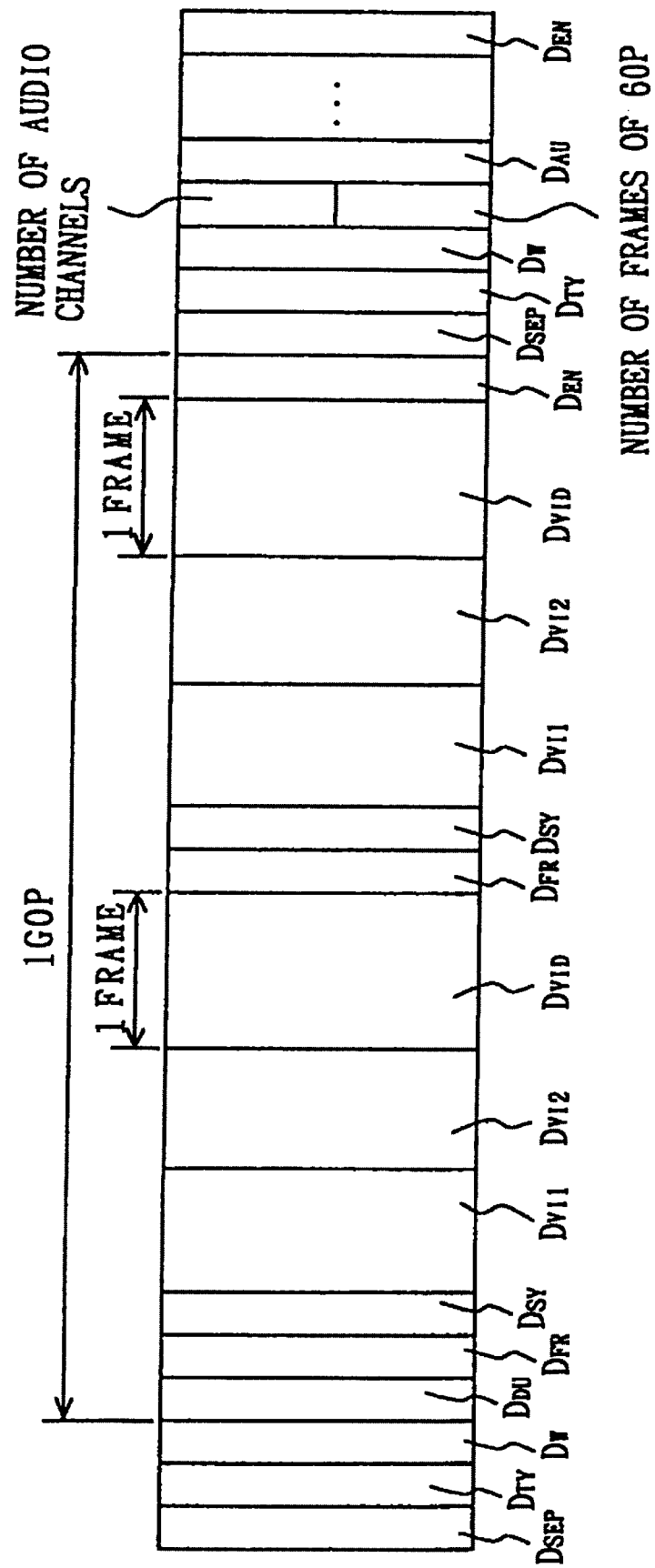
FIG. 7 is a schematic diagram showing items of the color frame information of the other stream.

As described above, the color frame information region $D_{CF}$ is inserted to a part of the compression processing information $D_F$ in each macro block provided in the frame information region $AR_{FR}$ at the head portion of each frame, but the insertion of the color frame information $D_{CF}$ is not restricted to such data construction but also the color frame information can be inserted with a data construction shown in FIG. 7 to a video index region immediately before the region to which one frame video data is inserted.

FIG. 7 generally shows a data construction for inserting a compressed video signal to the payload region $AR_{pay}$ having the signal format of the SDDI scheme shown in FIG. 5. The compressed video signal forms one GOP with two frames, and in which a separator region $D_{SEP}$, a type region $D_{TY}$, a word count region $D_W$, a dummy region $D_{DU}$, a frame header region $D_{FR}$, a system region $D_{SY}$, a video index of the first field region $D_{VI1}$, a video index of the second field region $D_{VI2}$, a video data region $D_{VID}$, also a frame header region $D_{FR}$, and a system region $D_{SY}$ are arranged in order.

The separator region $D_{SEP}$ includes dividing codes to divide different data. The type region $D_{TY}$ includes a data type showing whether the data included in the data region is the compressed data by the MPEG or the computer data. The word count region $D_W$ includes codes showing the data length of the data divided in the separator region $D_{SEP}$. Subsequently, a dummy code is inserted to the dummy region $D_{DU}$ followed by the frame header region $D_{FR}$, but the frame header region $D_{FR}$ includes a frame information item of a video tape to be inserted. The system region $D_{SY}$ includes various time codes of a video signal to be inserted for example. The video index of the first field region $D_{VI1}$ and the video index of the second field region $D_{VI2}$ respectively include a video index information of the video signal in the first field and a video index information of the video signal in the second field. In the present embodiment, the above-mentioned color frame information is inserted to these video index regions $D_{VI1}$ and $D_{VI2}$. Successively, a video signal for one frame is inserted to the video data region $D_{VID}$, followed by the frame header region $D_{FR}$ and the system region $D_{SY}$. The region next to the video data region $D_{VID}$ in which the second frame is inserted is an encode region showing the end of the regions including video signals. Then, the separator region $D_{SEP}$, the type region $D_{TY}$, the word count region $D_W$, are arranged and further a region showing the number of frames in one GOP, a region showing the number of channels of audio signals, and an audio signal region to store the audio signal on the base of channels are arranged successively.

With the data construction such the above, the color frame information needed in the present embodiment can be inserted respectively to the video index of the first field region $D_{VI1}$ and the video index of the second field region $D_{VI2}$.

As described above, the color frame information $D_{CF}$ can be inserted to a part of the compression processing information region $D_F$ in each macro block provided in the frame information region $AR_{FR}$ at the head portion of each frame in a data stream to be inserted to the payload region $AR_{pay}$ in the SDDI signal format, and also can be inserted to the video index regions $D_{VI1}$ and $D_{VI2}$ immediately before the video data region $D_{VID}$ in which a video signal of each frame is inserted. As the above, providing to have such data construction as the color frame information $D_{CF}$ is included in a data stream to be inserted to the payload region $AR_{pay}$ of the SDDI signal, it is not restricted to the above-mentioned two types of data construction and variable data construction available. Furthermore, it can be inserted to an auxiliary signal region without the payload region $AR_{pay}$ of the SDDI signal.

Moreover, provided that an interface can transmit compressed data and can transmit the color frame information $D_{CF}$ corresponding to the data with superimposing the data, even in other than the SDDI signal format, it can be available.

In accordance with the control signal $CONT_A$ delivered from the control section 25, the SDC circuit 17A delivers compressed video data $D_V$ including the color frame information $D_{CF}$ inputted by the SDDI signal $S_{SDDI1}$ to the hard disk drive (HDD) 18A, thereby recording them in a hard disk. In addition, in accordance with the control signal $CONT_A$, the SDC circuit 17A plays back compressed video data $D_V$ recorded in a hard disk from the HDD 18A and delivers it as SDDI signal $S_{SDDI1}$ to the compression decoder section 19A provided as an image decoder.

Figure 8:
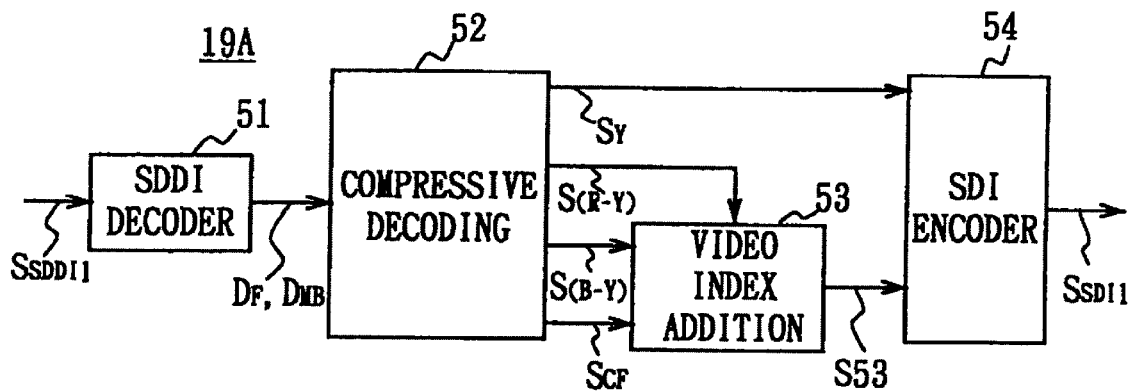
FIG. 8 is a block diagram showing one embodiment of a compressive decoder section using an image decoder according to the present invention.

Each compression decoder circuit 19A, 19B, . . . of the record unit section 15, as shown in FIG. 8, is composed of an SDDI decoder 51, fed the SDDI signal $S_{SDDI1}$ outputted from the SDC circuit 17A, 17B, and for outputting compressed video data $D_F$, $D_{MB}$ including the color frame information $D_{CF}$; a compressive decoder circuit 52, fed the compressed video data $D_F$, $D_{MB}$ from the SDDI decoder 51, for compressively decoding this and outputting a component video signal and a color frame information signal formed by a brightness signal $S_Y$ and two color-difference signals; a video index addition circuit 53, fed these two color-difference signals $S_{(R-Y)}$ and $S_{(B-Y)}$ and the color frame information signal $S_{CF}$ from the compressive decoding circuit 52, for adding the color frame information signal $D_{CF}$ to a part of two color-difference signals $S_{(R-Y)}$ and $S_{(B-Y)}$ and outputting this; and an encoder 54, fed these two color-difference signals $S_{(R-Y)}$ and $S_{(B-Y)}$ with the color frame information signal $D_{CF}$ added from the video index addition circuit 53 and the brightness signal $S_Y$ from the compressive decoding circuit 52, for converting them into a component serial signal $S_{SDI1}$ in the SDI format as shown in FIG. 5 and outputting this.

The SDDI signal $S_{SDDI1}$ played back from the HDD 18A and inputted to the compressive decoder 19A is first supplied to the SDDI decoder 51 and in which the compressed video data ($D_F$ and $D_{MB}$ (FIG. 6)) including color frame information $D_{CF}$ is reads out from the payload region $AR_{PAY}$ of serial data $D_{SDDI}$ (FIG. 5) in the SDDI format. This compressed video data is delivered to the following compressive decoding circuit 52.

By subjecting a compressive decoding processing such as inverse DCT processing and variable length decoding to compressed video data $D_F$ and $D_{MB}$, the compressive decoding circuit 52 obtains color frame information signals $S_{CF}$ made by decoding a component video signal composed of a brightness signal $S_Y$ and two color-difference signals $S_{(R-Y)}$ and $S_{(B-Y)}$ and color frame information $D_{CF}$.

The color-difference signal $S_{(B-Y)}$ and the color frame information signal $S_{CF}$ are delivered to the video index addition circuit 53. After adding the color frame information represented by the color frame information signal $S_{CF}$ to the color-difference signal $S_{(B-Y)}$, the video index addition circuit 53 delivers the resultant signal to the SDI encoder 54.

In according with the brightness signal $S_Y$ delivered from the compressive decoding circuit 52 and a color-difference signal (index signal) S53 with color frame information attached thereto delivered from the video index addition circuit 53, the SDI encoder 54 obtains an SDI signal $S_{SDI1}$ of component serial data configuration and delivers it to the selection circuit 21 (FIG. 1).

Here, as shown in FIG. 1, the record medium unit section 15, further comprising a plurality of record medium units 15B, . . . similar in configuration to the above-mentioned record medium units 15A, is so arranged that in each record medium unit 15B, . . . , compressed video data can be recorded/played together with the frame color information $D_{CF}$ in each HDD 18B, . . . . Thus, an SDI signal $S_{SDI2}$, . . . outputted from each record medium unit 15B, . . . is delivered similarly to the selection circuit 21, respectively.

In accordance with a control signal CONT2 delivered from the control section 25, the selection circuit 21 selects a predetermined SDI signal $S_{SDIx}$ from a plurality of SDI signals $S_{SDI1}$, $S_{SDI2}$, . . . and simultaneously selects the destination of the relevant SDI signal $S_{SDIx}$ out of a plurality of YC encoders 22A, 22B, . . . , 22n.

Figure 9:
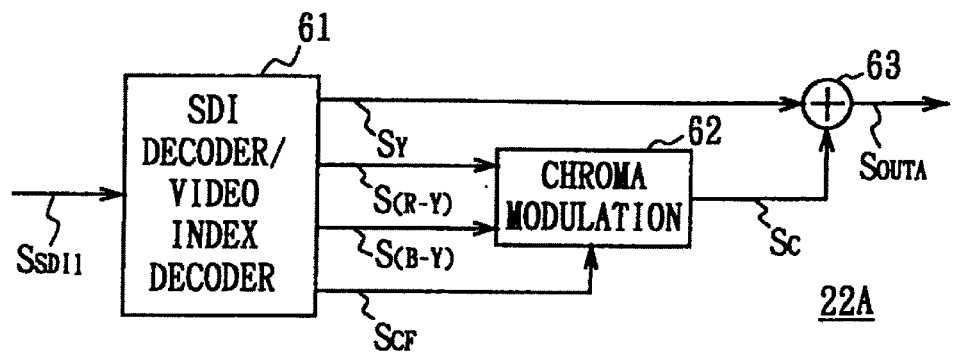
FIG. 9 is a block diagram showing the configuration of a YC encoder.

In FIG. 1, when the selection circuit 21 appoints a first YC encoder 22A, for example, for the first SDI signal $S_{SDI1}$, as shown in FIG. 8, the relevant SDI signal $S_{SDI1}$ is delivered to the SDI decoder/video index decoder 61 (FIG. 9) of the YC encoder 22A. That is, in FIG. 9, the SDI decoder/video index decoder 61 decodes the brightness signal $S_Y$, the color-difference signals $S_{(R-Y)}$ and $S_{(B-Y)}$ from the SDI signal $S_{SDI1}$ and simultaneously separates the color frame information signal $S_{CF}$ as index signal contained in a color-difference signal $S_{(B-Y)}$.

Thus, two color-difference signals $S_{(R-Y)}$ and $S_{(B-Y)}$ are delivered to a chroma modulation circuit 62 and chroma-modulated in accordance with the color frame information $D_{CF}$ inputted as the color frame information signal $S_{CF}$. That is, because the color-difference signals $S_{(R-Y)}$ and $S_{(B-Y)}$ are respectively chroma-modulated at the same phase as that of a color frame during the YC separation in the YC decoder 11A mentioned above in connection to FIG. 1. No deterioration of images takes place during the modulation. The chroma signal $S_C$ obtained thus is delivered to the addition circuit 63 and synthesized with the brightness signal $S_Y$ outputted from the SDI decoder/video index decoder 61, thereby generating a composite video signal $S_{OUTA}$. This composite video signal $S_{OUTA}$ is outputted to the outside from the output terminal T10A of the record/play system 10 (FIG. 1).

Furthermore, with respect to a plurality of YC encoders 22B, . . . , 22n similar in configuration to the YC encoder 22A, the SDI signal (any of $S_{SDI1}$, $S_{SDI2}$, . . . ) selected and outputted from the selection circuit 21 is inputted similarly thereto and composite video signals $S_{OUTB}$, . . . , $S_{OUTn}$ are obtained in accordance with the color frame information ($D_{CF}$) attached to the respective SDI signals.

In the above configuration, the record/play system 10 extracts the color frame information $D_{CF}$ added to the respective SDI signals $S_{SDI1}$, $S_{SDI2}$, . . . inputted in each compressive encoder section 16A, 16B, . . . of the record/play unit section 15 prior to the compression processing by a high-efficiency encoding and moreover adds this information to a stream of compressed video data subjected to the compression processing, so that the relevant color frame information $D_{CF}$ is free from a compression processing such as DCT processing and variable-length encoding processing.

Thus, data concerning the relevant items of color frame information $D_{CF}$, produced during the YC separation in the YC decoders 11A, 11B, . . . , 11n, undergo no deformation due to the compressive encoding processing and are added to a stream of the compressed video data after the compressive processing as they are. Thereby, the respective items of color frame information $D_{CF}$ are recorded to the HDDs 18A, 18B, . . . as data at the YC separation by the YC decoder left invariant.

On the other hand, the items of color frame information $D_{CF}$ added to the respective compressed video data played back from the HDDs 18A, 18B, . . . as record/play means are extracted prior to the compressive decoding processing and added to the video data after the compressive decoding processing, so that the relevant item of color frame information $D_{CF}$ is subjected to no decoding processing such as inverse DCT processing and variable-length decoding processing.

Thus, with respect to the respective data forms (i.e., the respective data produced at the YC separation in the YC decoders 11A, 11B, . . . , 11n) stored in the HDDs 18A, 18B, . . . , the relevant color frame information $D_{CF}$ undergoes no deformation by the compressive decoding processing and is added to the data after the decoding processing as they are. Thereby, the color frame information $D_{CF}$ is played back from the record/play unit section 15 with the data at the YC separation by the YC decoder kept invariant.

Thus, by the synthesis of a composite video signal in each encoder 22A, 22B, . . . , 22n by using the respective items of color frame information $D_{CF}$, the chroma modulation in conformity with the phases of each color frame is performed, thus enabling the deterioration of images in the resolution of playback images to be prevented.

According to the above arrangement, transmission of color frame information $D_{CF}$ free from deformation (loss) together with the compressed video data in the record/play unit section 15 enables the reproduced video image without any deterioration of images to be obtained.

Incidentally, the above embodiment has dealt with the case of putting video signals outputted from the YC decoders 11A, 11B, . . . , 11n in the SDI format. However, the present invention is not only limited to this but also may be applicable to cases of conversion into data of other various formats.

Furthermore, the above embodiment has dealt with the case of compressing data using the technique of MPEG as for the compression encoder units 16A, 16B, . . . and the compression decoder units 19A, 19B, . . . . However, the present invention is not only limited to this but also is widely applicable, e.g., to a case of data compression using techniques, such as forecasting encoding (DPCM: differential pulse code modulation) and wavelet conversion, in brief, to cases using other various compression techniques in which the data format of the color frame information $D_{CF}$ added to video data changes.

Furthermore, the above embodiment has dealt with the case of creating video data of the SDDI format in the compressive encoder sections 16A, 16B, . . . . However, the present invention is not only limited to this but also is applicable to cases of conversion into data of other various formats.

Furthermore, the above embodiment has dealt with the case of transmitting a video signal in the 525 scanning line/60 field scheme. However, the present invention is not only limited to this but also is applicable to cases of other video signal transmission (record/play) schemes, such as 625 scanning line/50 field scheme.

Furthermore, the above embodiment has dealt with the case of using the HDDs 18A, 18B, . . . as record/play apparatuses for video data. However, the present invention is not only limited to this but also is widely applicable, for example, to those for record/play of data on tape-shaped recording medium or to an apparatus for optical record/play of data on optical disks.

Furthermore, the above embodiment has dealt with the case of providing the color frame information $D_{CF}$ in a frame information region $AR_{FR}$ (FIG. 6). However, the present invention is not only limited to this but also the color frame information $D_{CF}$ may be provided in other various regions.

Moreover, the above embodiment has dealt with the case where the present invention is applied to a record/play system 10 using a record/play device (HDD). However, the present invention is not only limited to this but also is widely applicable to transmission devices of video signals using a predetermined transmission path in place of a record/play device.

As mentioned above, according to the present invention, the color frame information in separating a predetermined video signal into a luminance component and a color component (chroma component) is extracted prior to the compressive encoding processing of a video signal and is added after the compressive encoding processing, thereby enabling data on color frame information to be added to a compressed video signal after the compressive encoding as they remain invariant free from deformation (loss) and delivered to transmission means.

In addition, the color frame information is extracted prior to the decoding processing of the compressed video signal obtained from transmission means and is added after the decoding processing, thereby enabling data on color frame information to be added to a decoded video signal after the decoding processing as they remain invariant free from deformation (loss) and delivered to transmission means. In this manner, since the color frame information is added to the decoded video signal and is delivered, a playback video signal can be obtained using the relevant items of color frame information and therefore the deterioration of playback images can be prevented.

INDUSTRIAL APPLICABILITY

The present invention is applicable to an encoder and a decoder and encoder/decoder device in an image transmission system in which after a composite video signal is converted into component video signals, they are compressively coded and delivered to transmission means and moreover a compressed video signal obtained from the transmission means is restored to a composite video signal after decoded.

What is claimed is:

1. An image encoder for compressively encoding an input video signal forming a compressed video signal separated from a predetermined video signal into a luminance component and a color component to deliver them to predetermined transmission means, comprising:

extraction means for extracting a color frame information previously added to said color component of said input video signal prior to said compressive encoding; and addition means for adding said color frame information extracted from said extraction means to the compressed video signal after said compressive encoding.

2. The image encoder according to claim 1, wherein;

said predetermined transmission means is record/play means for recording/playing the compressed video signal with said color frame information added supplied from said addition means.

3. The image encoder according to claim 2, wherein;

said record/play means is formed by a non-linearly accessible recording medium.

4. The image encoder according to claim 1, further including;

SDI decoding means for delivering the compressed video signal with the color frame information added thereto from the input video signal in the format of serial digital interface (SDI) to said extraction means.

5. The image encoder according to claim 1, further including;

SDDI encoding means fed said compressed video signal to which said color frame information was added in said addition means to deliver said color frame information to said transmission means in the format of serial digital data interface (SDDI).

6. An image decoder for decoding a compressed video signal inputted via predetermined transmission means to supply the decoder signal forming a decoded video signal, comprising:

extraction means for extracting a color frame information previously added to said compressed video signal prior to said decoding; and addition means for adding said color frame information extracted from said extraction means to a color component of said decoded video signal after said decoding.

7. The image decoder according to claim 6, wherein;

said predetermined transmission means is record/play means for recording/playing the compressed video signal with said color frame information previously added thereto.

8. The image decoder according to claim 7, wherein;

said predetermined record/play means is formed by a non-linearly accessible recording medium.

9. The image decoder according to claim 6, wherein;

said input compressed video signal inputted is in the format of serial digital data interface (SDDI), and said image decoder further including;

SDDI decoding means for outputting said compressed video signal including the color frame information from the compressed video signal in the relevant format.

10. The image decoder according to claim 6, further including;

SDI encoding means, fed the decoded video signal to which said color frame information outputted from said addition means is added to output the decoded video signal with said color frame information added in the format of serial digital interface (SDI).

11. An image encoding method for compressively encoding an input video signal forming a compressed video signal separated from a predetermined video signal into a luminance component and a color component to deliver them to predetermined transmission means, comprising:

the extraction step of extracting a color frame information previously added to said color component of said input video signal prior to said compressive encoding; and the addition step of adding said color frame information extracted in said extraction step to the compressed video signal after said compressive encoding.

12. The image encoding method according to claim 11, wherein;

said predetermined transmission means is record/play means for recording/playing the compressed video signal with said color frame information previously added thereto.

13. The image encoding method according to claim 12, wherein;

said record/play means is formed by a non-linearly accessible recording medium.

14. The image encoding method according to claim 11, wherein;

said input video signal is in the format of serial digital interface (SDI), and said image encoding method further including;

the SDI decoding step of outputting the compressed video signal with the color frame information added thereto from the input video signal in the relevant format to said encoding step.

15. The image encoding method according to claim 14, further including;

the SDDI encoding step fed said compressed video signal to which said color frame information was added in said addition step to deliver said color frame information to said transmission means in the format of serial digital data interface (SDDI).

16. An image decoding method for decoding a compressed video signal inputted via predetermined transmission means to output a decoded signal, comprising:

the extraction step performed prior to decoding of extracting a color frame information previously added to said compressed video signal prior to said decoding; and the addition step of adding said color frame information extracted in said extraction step to a color component of said decoded video signal after said decoding.

17. The image decoding method according to claim 16, wherein;

said predetermined transmission means is record/play means for recording/playing the compressed video signal with said color frame information added thereto.

18. The image decoding method according to claim 17, wherein;

said record/play means is formed by a non-linearly accessible recording medium.

19. The image decoding method according to claim 16, wherein;

said compressed video signal inputted is in the format of serial digital data interface (SDDI), and said image decoding method further including;

the SDDI decoding step of outputting the compressed video signal including the color frame information from the video signal in the relevant format.

20. The image decoding method according to claim 14, further including;

the SDI encoding step fed the decoded video signal with said color frame information added thereto outputted in said addition step to output the decoded video signal with said color frame information added thereto in the format of serial digital interface (SDI).

21. An image encoding/decoding device for compressively encoding an input video signal forming a compressed video signal separated from a predetermined video signal into a luminance component and a color component to deliver them to predetermined transmission means, and decoding and outputting the compressed video signal inputted via the predetermined transmission means as a decoded video signal comprising:

the first extraction means for extracting a color frame information previously added to said color component of said input video signal prior to said compressive encoding;

the first addition means for adding said color frame information extracted from said first extraction means to the compressed video signal after said compressive encoding;

the second extraction means for extracting the color frame information previously added to the compressed video signal inputted via said predetermined transmission means prior to said decoding; and the second addition means for adding said color frame information extracted from said second extraction means to said color component of said decoded video signal after said decoding.

22. The image encoding/decoding device according to claim 21, wherein;

said predetermined transmission means is record/play means for recording/playing the compressed video signal with said color frame information outputted from said addition means added thereto.

23. The image encoding/decoding device according to claim 22, wherein;

said record/play means is formed by a non-linearly accessible recording medium.

24. The image encoding/decoding device according to claim 21, wherein;

said input video signal is in the format of serial digital interface (SDI), and said image encoding/decoding device further including;

SDI decoding means for outputting the decoded video signal with the color frame information added thereto from the video signal in the relevant format to said first extraction means.

25. The image encoding/decoding device according to claim 21, further including;

SDDI encoding means fed said compressed video signal to which said color frame information was added in said first addition means to deliver this to said transmission means in the format of serial digital data interface (SDDI).

26. The image encoding/decoding device according to claim 21, wherein;

the compressed video signal inputted via said predetermined transmission means is in the format of serial digital data interface (SDDI), and said image encoding/decoding device further including;

SDDI decoding means for outputting a compressed video signal including the color frame information from the compressed video signal in the relevant format.

27. The image encoding/decoding device according to claim 21, further including;

SDI encoding means fed the decoded video signal with said color frame information added thereto outputted from said second addition means to deliver a decoded video signal with said color frame information added in the format of serial digital interface (SDI).

28. An image encoding/decoding method for compressively encoding an input video signal separated from a predetermined video signal into a luminance component and a color component to deliver them to predetermined transmission means forming a compressed video signal, and decoding and outputting the compressed video signal inputted via the predetermined transmission means forming a decoded video signal comprising:

the first extraction step of extracting color frame information previously added to said color component of said input video signal prior to said compressive encoding;

the first addition step of adding said color frame information extracted from said first extraction step to the compressed video signal after said compressive encoding;

the second extraction step of extracting the color frame information previously added to the compressed video signal inputted via said predetermined transmission means prior to said decoding; and the second additional step of adding said color frame information extracted from said second extraction step to said color component of said decoded video signal after said decoding.

29. The image encoding/decoding method according to claim 28, wherein;

said predetermined transmission means is record/play means for recording/playing the compressed video signal with said color frame information added thereto in said first addition step.

30. The image encoding/decoding method according to claim 29, wherein;

said record/play means is formed by a non-linearly accessible recording medium.

31. The image encoding/decoding method according to claim 28, wherein;

said input video signal is in the format of serial digital interface (SDI), and said image encoding/decoding method further including;

the SDI decoding step of outputting the video signal to which the color frame information was added from the video signal in the relevant format to said first extraction step.

32. The image encoding/decoding method according to claim 28, further including;

SDDI encoding step fed said compressed video signal to which said color frame information was added in said first addition step to output this to said transmission means in the format of serial digital data interface (SDDI).

33. The image encoding/decoding method according to claim 28, wherein;

the compressed video signal inputted via said predetermined transmission means is in the format of serial digital data interface (SDDI), and said image encoding/decoding method further including;

the SDDI decoding step of supplying a compressed video signal including the color frame information from the compressed video signal in the relevant format.

34. The image encoding/decoding method according to claim 28, further including;

the SDI encoding step fed the decoded video signal with said color frame information added thereto outputted in said second addition step to output a decoded video signal with said color frame information added in the format of serial digital interface (SDI).

* * * * *